No. 879,195. PATENTED FEB. 18, 1908.
H. S. SAMUEL.
WIND SHIELD OR WEATHER SCREEN FOR MOTOR AND SIMILAR VEHICLES.
APPLICATION FILED DEC. 21, 1905.

2 SHEETS—SHEET 1.

Witnesses
Thomas Durant
Elizabeth Griffith

Inventor:
Henri S. Samuel
Church & Church
his Attys

No. 879,195.　　　　　　　　　　　　　PATENTED FEB. 18, 1908.
H. S. SAMUEL.
WIND SHIELD OR WEATHER SCREEN FOR MOTOR AND SIMILAR VEHICLES.
APPLICATION FILED DEC. 21, 1905.

2 SHEETS—SHEET 2.

Witnesses
Thomas Durant
Elizabeth Griffut

Inventor
Henri S. Samuel
by Church & Church
his Attys

UNITED STATES PATENT OFFICE.

HENRI SAUL SAMUEL, OF PERTH, SCOTLAND.

WIND-SHIELD OR WEATHER-SCREEN FOR MOTOR AND SIMILAR VEHICLES.

No. 879,195.  Specification of Letters Patent.  Patented Feb. 18, 1908.

Application filed December 21, 1905. Serial No. 292,781. REISSUED

*To all whom it may concern:*

Be it known that I, HENRI SAUL SAMUEL, a subject of the King of Great Britain, and residing at Perth, Scotland, have invented a certain new and useful Wind-Shield or Weather-Screen for Motor and Similar Vehicles, of which the following is a specification.

This invention relates to wind or weather shields or screens for motor and similar vehicles and has for its chief object to provide a neat and efficient screen that can be readily adjusted or moved to suit requirements.

The shield or screen is made in two parts, one extending inwardly and upwardly from the dash or front part of the vehicle so as to protect at all times the driver's hands while grasping the steering wheel or handle independently of the position of the second part of the screen which is adjustable and serves as a substantially vertical shield for the face and the upper part of the body of the occupant of the driver's seat and also as a substantially horizontal table.

Figure 1:
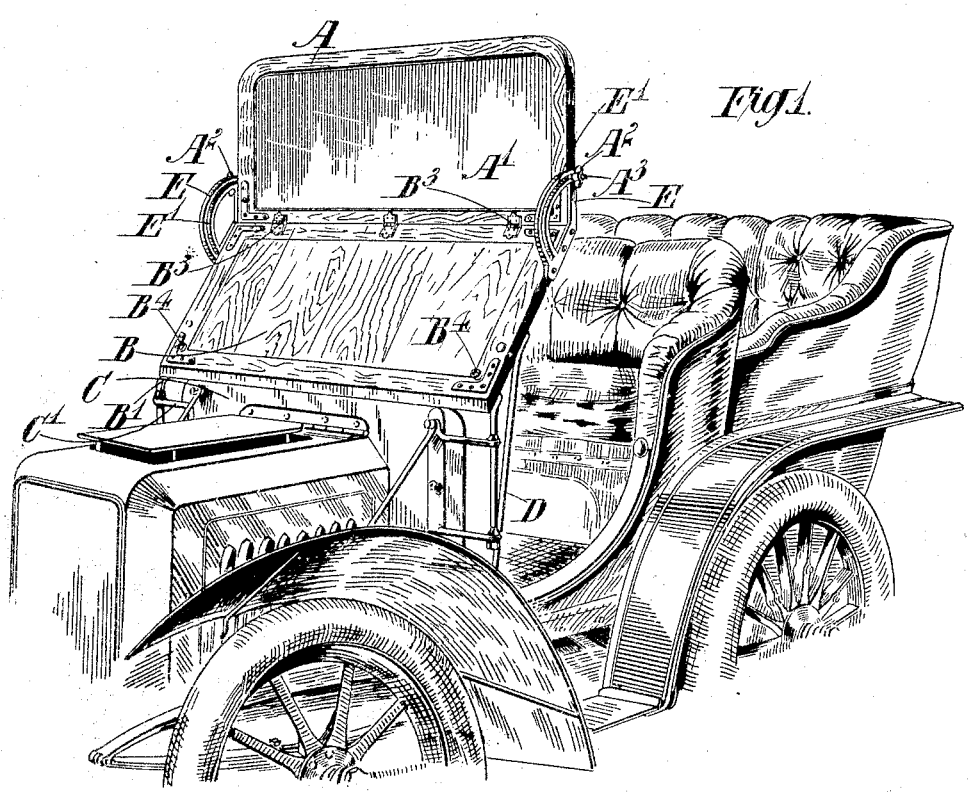
Figure 2:
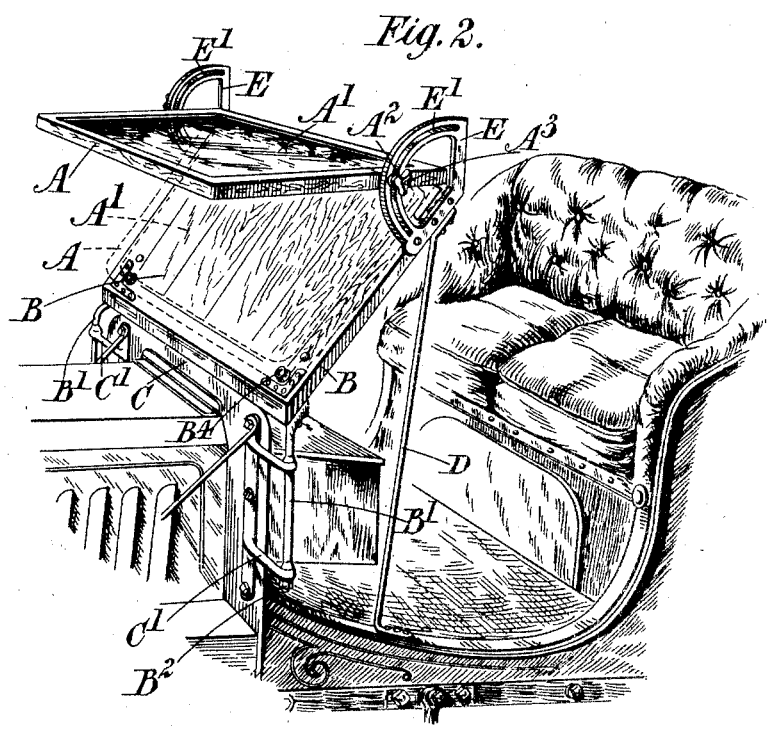

Referring to the drawings:—Figure 1 is a perspective view of one form of weather guard or screen for a motor car constructed in accordance with this invention, the screen being shown raised to its fullest extent, and Fig. 2 is a similar view of the screen with the upper part in an intermediate position in which it serves for a table or support.

A is the upper or transparent portion and B the lower portion of the screen. The upright part A has a window and is supported in such a manner that it can be raised or lowered bodily and preferably also so that it can be placed vertically, inclined at any convenient angle, or folded down in front horizontally so that it may serve as a table or support. Or each frame or window in the upper part of the shield may be separately adjustable.

The upper part A is glazed or provided with a transparent material $A^1$ or it may have two or more glazed or transparent openings. This part is hinged or pivotally connected along its lower edge to the lower part B of the screen which extends inwardly and upwardly from the dash or front of the car, that is to say, it projects from the dash at or near to the level of or over the steering wheel and other manipulating gear in such a manner that while coming close to the steering wheel so as to protect or shield the hands of the driver it does not interfere with his movements in operating the steering wheel. At the same time this part of the guard shields the lower part of the body of the driver or other occupant of the front seat of the vehicle. The second or lower part of the guard may be hinged or otherwise suitably connected at one end to the dash or front of the car. It extends inwardly and upwardly to a level near that of the steering wheel or handle and is so arranged that while affording the required protection for the driver's hands while on the steering wheel or handle and also for the lower part of the body it does not interfere with the manipulation or operation of the steering wheel or levers over which it projects.

The lower member B of the shield is preferably rigidly connected to the car or vehicle in any appropriate manner. In the example shown standards $B^1$ are attached to the lower part of the shield and these enter brackets $C^1$ on the dash C and are secured therein by nuts $B^2$ (see Fig. 2) on the threaded ends of the standards. Additional supports may be employed in connection with the lower part of the shield, such for example as the studs D which may be attached to the underside of the part B and to the floor or body of the vehicle. The lower member B instead of being rigidly connected to the dash or to another part of the vehicle may be hinged or otherwise pivotally connected to the dash, in which case the struts D may be adjustably connected to the body of the car.

The upper part A of the screen when in the vertical position shown in Fig. 1 protects or shields the face of the driver while permitting him a clear view of the forward part of the vehicle and also of the road ahead. It comes sufficiently close to him to avoid drafts or strong air currents coming between it and him and is conveniently connected to the lower part by hinges $B^3$. The part A is also adjustable relatively to the lower part so that it can be raised or lowered at will.

A convenient form of adjustment by which the part A can be fixed in the required position is shown in the drawings and consists of slotted segments E $E^1$ connected to the lower part B and through the slots in which bolts $A^3$ on the upper part A of the shield project, clamping nuts $A^2$ being provided to lock the upper part to the segments at any desired point. When the part A of the shield is lowered into the horizontal position shown in full lines in Fig. 2, it may serve as a luncheon table or as a support for maps, guide books or other articles and in place of folding down outwards it may be adapted to fold inwards. When desired the part A may be lowered to lie against the part B as shown in dotted lines in Fig. 2, proper cushions B¹ being provided to prevent noise when the shield is in this position and any appropriate catches may be used to lock the two parts together when folded down.

It will be appreciated that when the parts are as shown in Fig. 1, the shield is carried as close to the occupants of the front seat as is possible without interfering with their freedom of movement or interrupting their view, but affording an efficient protection from wind or dust, and whether the part A is raised or lowered the hands of the driver which are constantly required upon the steering wheel are always hidden from the weather. On account of the manner in which the shield is constructed it does not afford such a resistance to the wind as it would if continued straight up from the dash and when the part A of the shield is not in use and is folded down the entire shield occupies very little space. The part B instead of being slotted as shown may also comprise a frame such as the part A glazed or provided with transparent material as above described. Either or both parts may be divided vertically each part being separately adjustable. Additional side flaps may be provided on the parts A and B and a top inwardly projecting flap on the part A if desired, these flaps being separately adjustable and connected to the main part of the shield in any appropriate manner.

The shield has been described as consisting of two parts, but it is also within the scope of this invention to form the upright part of more than one piece so as to provide for the height of the screen being varied to a greater extent than can be obtained by the means above described and without moving the lower part of the shield. The lower member may also be made in two or more parts so that the entire car may be caused to occupy a minimum of space when not in use. The upright part may be divided vertically. Additional flaps extending inwardly over the driver or the occupant of the driver's seat may be provided and flaps or extensions adjustable in any convenient manner may be provided at the sides of the shield.

What I claim as my invention and desire to secure by Letters Patent is:—

1. A wind guard for vehicles consisting of a lower rigid flat portion permanently secured to the vehicle and extending transversely thereof and inclined rearwardly in proximity to the steering wheel or handle and an upper portion extending upwardly from the lower portion in front of the driver's face.

2. A wind guard for vehicles consisting of a lower stationary flat portion extending transversely of the vehicle and inclined rearwardly in proximity to the steering wheel or handle, and an upper flat portion adjustably mounted upon the lower portion.

3. In a wind shield for a motor or similar vehicle, the combination with the dash or front part of the vehicle of a lower member fixed to the dash and extending inwardly and upwardly to a level near that of the steering wheel or handle and a second flat member extending vertically upwards from the lower member in front of the driver's face and means for adjusting the upper member relatively to the lower member.

4. In a wind shield for a motor or similar vehicle, the combination with the dash or front part of the vehicle of a lower fixed member extending inwardly and upwardly from the dash to a level near that of the steering wheel or handle, a flat upper movable member extending up in front of the driver's face hinged or pivoted to the lower member, a slotted quadrant fixed to one member, and a clamping device on the other member coöperating with the slotted quadrant for the purpose described.

In testimony whereof I have signed my name to this specification in the presence of two subscribing witnesses.

HENRI SAUL SAMUEL.

Witnesses:
M. BOWMAN,
FREDERICK PIATT.